Sept. 7, 1965  K. E. CAINE  3,204,755
CONTINUOUSLY EXTENSIBLE CONVEYOR
Filed April 29, 1963  2 Sheets-Sheet 2
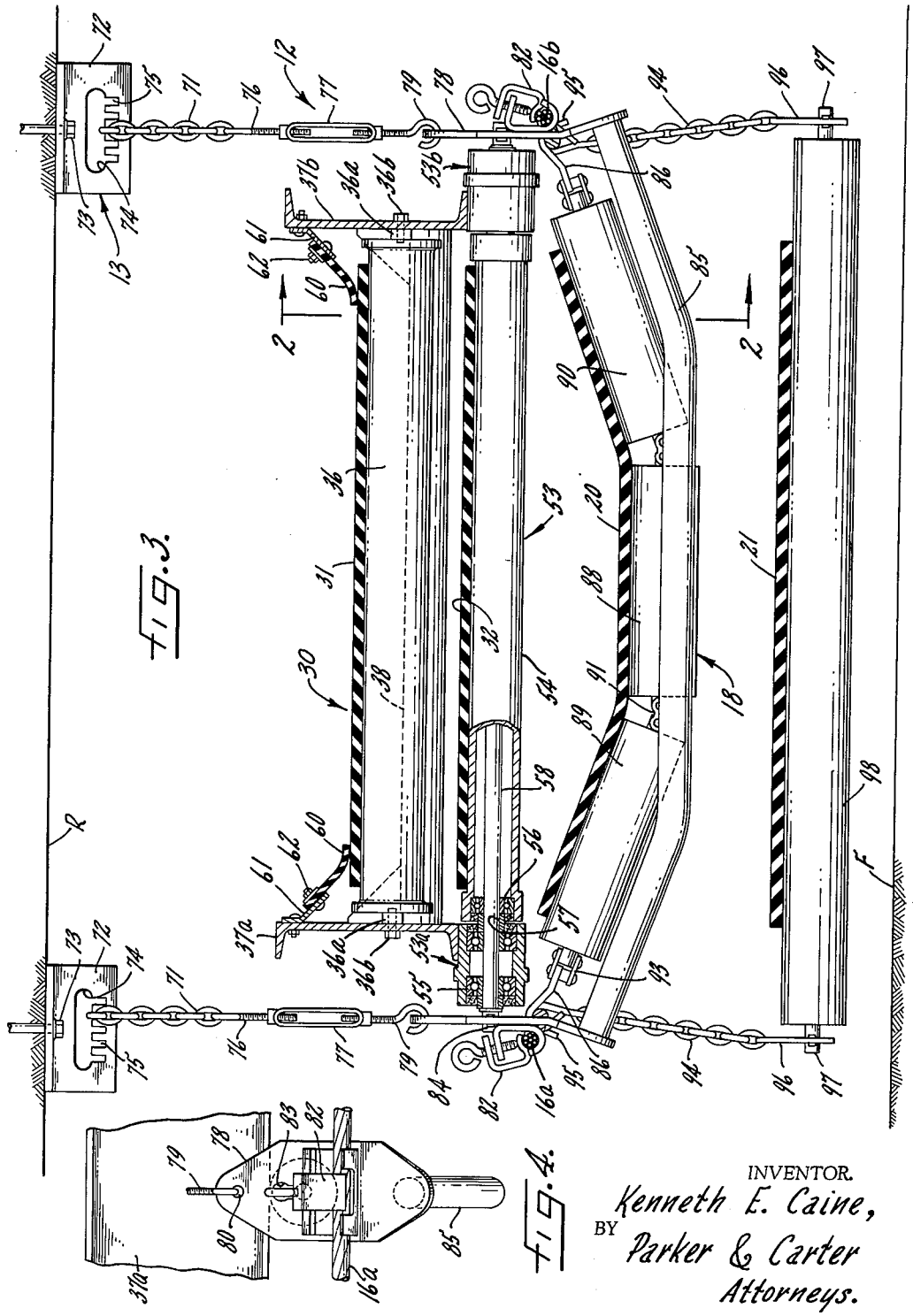
INVENTOR.
Kenneth E. Caine,
BY Parker & Carter
Attorneys.

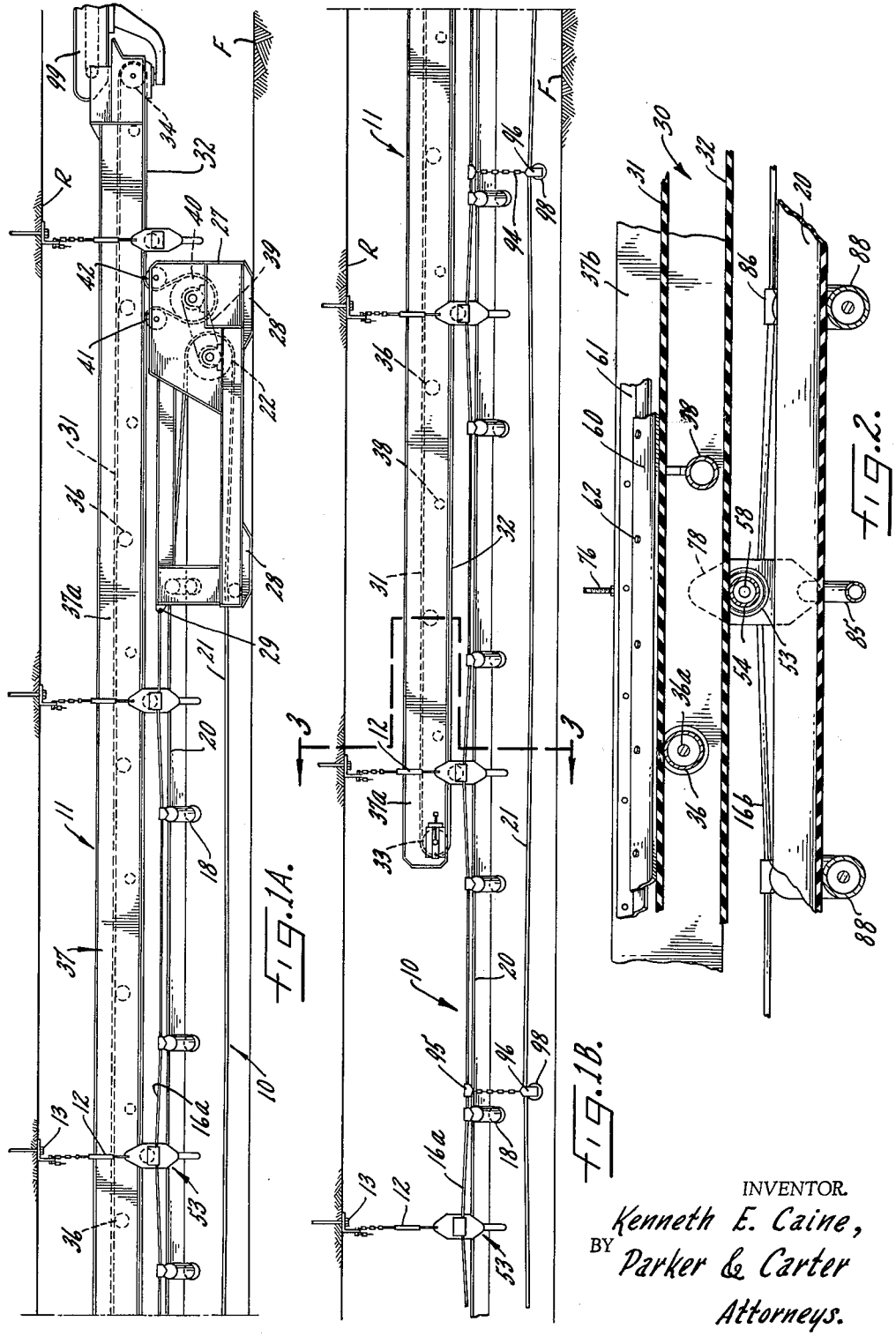

United States Patent Office 3,204,755
Patented Sept. 7, 1965

3,204,755
CONTINUOUSLY EXTENSIBLE CONVEYOR
Kenneth E. Caine, Hinsdale, Ill., assignor to Goodman Manufacturing Company, Chicago, Ill., a corporation of Illinois
Filed Apr. 29, 1963, Ser. No. 276,297
8 Claims. (Cl. 198—139)

This invention relates to extensible conveyor systems, and particularly to a method and apparatus for continuously extending a conveyor behind a continuously advancing mining operation.

Advancing conveyor systems for underground coal mining have been proposed in the past. Nearly invariably these systems have utilized a main conveyor, which may be several hundred or thousand feet in length, and a secondary conveyor, the secondary conveyor being located alongside the main conveyor and discharging onto the main conveyor by means of a chute or other transfer structure transversely positioned with respect to the longitudinal axis of the conveyor.

These prior systems have several practical disadvantages, perhaps the greatest being that the side-by-side placement of the conveyors requires a very wide entry. The great width of present systems raises additional problems such as roof support and side clearance.

Accordingly, a primary object of this invention is to provide a continuously advancing extensible conveyor system which requires no additional lateral clearance over that required by the main conveyor.

Another object is to provide a method of continuously extending a conveyor behind an advancing mining operation.

Another object is to provide an extensible conveyor assembly in which a continuously advanceable auxiliary conveyor is vertically aligned with and discharges onto a main conveyor.

Another object is to provide a continuously extensible conveyor system in which auxiliary conveyor tensioning devices and transverse discharge structures are eliminated.

Another object is to provide an extensible conveyor system having a main conveyor and an overlying conveyor in which the tail of an overlying conveyor may be attached to a miner or other advancing equipment which advances the overlying conveyor relative to the main conveyor.

Another object is to provide a conveyor system in which the same roof anchors and suspending members which support a stationary rope frame conveyor may be used to support an advancing auxiliary or yo-yo conveyor.

Another object is to provide a conveyor system having a main conveyor and an overlying conveyor which moves relative to the main conveyor with the same power source powering each conveyor.

Yet a further object is to provide an advanceable conveyor system having a main conveyor and an auxiliary conveyor, both of said conveyors being continuously advanceable whereby down time for extension of the system is practically eliminated.

The foregoing objects are realized along with other objects, which will become apparent, by the invention which is illustrated in the accompanying drawings wherein:

FIGURE 1A is a front segment in diagrammatic side view of the conveyor assembly, FIGURE 1B is a rear segment in diagrammatic side view of the conveyor assembly, FIGURE 2 is a view along line 2—2 of FIGURE 3, FIGURE 3 is a view along line 3—3 of FIGURE 1B, and FIGURE 4 is an enlarged side view of the connector with parts broken away.

Like numerals in the various views refer to like structures and parts.

A main conveyor is indicated generally at 10 and an auxiliary conveyor at 11 in FIGURES 1A and 1B. The main conveyor is roof suspended by a plurality of suspending members 12 which are secured to the roof R of the entry by roof anchors 13. The suspending members are connected to a pair of generally parallel wire ropes 16a, 16b, which form the side frame of main conveyor 10. A plurality of troughing idler assemblies 18 are hung between the ropes 16a, 16b. An endless orbitally movable belt having a conveying reach 20 and a return reach 21 is wrapped around a tail pulley 22 and a head pulley, not shown. The tail pulley is rotatively supported in a housing or other support structure 27 which moves along the floor F of the mine by skids 28. One end of each wire rope may be tied off at the housing as at 29. Alternately, and often preferably, the ropes may be tied off at tie off points which are independent of support structure 27. In this event the support structure merely carries the tail pulley and, perhaps, a belt tensioning device.

The auxiliary conveyor also includes an endless belt 30 having a conveying reach 31 and a return reach 32 wrapped around a head pulley 33 and a tail pulley 34.

The head and tail pulleys, and intermediate conveying reach supporting rollers 36, are carried by a rigid, lightweight frame indicated at 37. The frame includes a pair of opposed, identical channels 37a and 37b which are maintained a fixed distance apart by struts or spacers 38. The supporting roller shaft 36a is secured to channels 37a, 37b by bolts 36b.

In the illustrated embodiment the tail pulley of the main conveyor is the power source for the auxiliary conveyor belt. Any suitable power transmission means 39, such as a chain or V belt drive, connects the tail pulley to a drive pulley 40 which is stationary and fixed to the housing 27. Snubbing rollers or pulleys 41 and 42 form a driving loop around drive pulley 40 to provide good belt wrap about the drive pulley irrespective of the position of the auxiliary conveyor relative to the main conveyor.

Each of the spaced elongated channels 37a, 37b of the auxiliary conveyor has a bottom surface which rides on a split roller assembly 53. The split roller 53 includes end portions 53a, 53b which are separated from a central portion 54. The end and central portions of each split roller assembly rotate about a dead shaft 58. Bearings are indicated at 55 and 56, and a shaft seal at 57. The central portion of the split roller provides a riding surface for the return reach of the endless belt on the auxiliary conveyor.

Elongated flexible panels 60, which are fixed to elongated anchor members 61 by bolts or the like 62, form, with the conveying reach, a conveying trough. The bottoms of the panels frictionally ride atop of the conveying reach.

Suspending members 12 which support both conveyors from the roof include a chain portion 71 which is attached adjustably at its upper end to a roof bracket 72. The bracket is secured to the mine roof by a bolt 73, the roof bracket and bolt forming the roof anchor 13. The roof bracket has a cut-out portion 74 with a series of vertical slots 75. The chain may be fixed in the cut-out portion by placing a link in a vertical slot. The chain is connected to a threaded hook or eye-bolt 76 of turnbuckle 77. A connector bracket 78 is adjustably secured to the turnbuckle by the threaded hook 79 which is received in the aperture 80. The connector bracket includes a rope clamp 82 secured thereto. The connector bracket also has a key slot 83 in which the milled ends 84 of the split roller shaft 58 are inserted.

A plurality of rope spreader members 85 maintain the rope gauge or spacing substantially constant along the conveyor at the points of connection of the suspending members to the wire rope side frames.

A plurality of troughing idler assemblies having hook and wedge type connectors or the like 86 at their ends are suspended between the wire ropes along the length of the main conveyor. The troughing idler assemblies consist of a center roller 88 flanked by wing rollers 89 and 90. The wing rollers may be joined to the center roller by an articulating link 91 to permit vertical motion. The wing rollers may be joined to the rope engaging hooks by a horizontal link 93 to permit horizontal motion. Chains 94 are connected to the wire ropes by clamps 95 as best seen in FIGURES 1B and 3. The chains carry bracket plates 96 at their lower ends, the ends of dead shaft 97 of a return roller 98 being fixed to the bracket plates.

The tail end of a tractor, continuous miner, or other piece of equipment which may or may not be self-propelled is indicated at 99.

The use and operation of the invention are as follows:

This invention enables a conveyor system to be continuously extended behind an advancing mining operation. Equally as important, extensive apparatus changes are not required as the conveyor advances. New supporting structure is installed, the conveyor is supported by it, and that is the end of it.

Referring first to FIGURES 1A and 1B, assume that the main conveyor 10 has just been advanced to its illustrated position. The wire rope side frames 16a and 16b of conveyor 10 downstream from the support structure 27, that is to the left of FIGURE 1B (and thereby the balance of the conveyor), are supported from the roof R by suspending members 12. Each suspending member includes a chain 71, hooks or eye-bolts 76 and 79, turnbuckle 77, connector bracket 78, and rope clamp 82.

As the tail or discharge end of the continuous miner or tractor 99 to which the auxiliary conveyor 11 is connected advances, that is, moves to the right in FIGURE 1A, additional, oppositely disposed pairs of suspending members 12 are installed from the roof. The longitudinal spacing between adjacent pairs of suspending members may be 20 feet or any other conventional distance employed in underground mines.

An initial, rough adjustment of the length of the suspending members is made at the time of installation by selecting the appropriate link in chain 71 to be fitted into the proper slot 75 in roof bracket 72. This is easily done since the chain supports no weight other than the turnbuckle and hooks. At this time the turnbuckles have been adjusted to substantially their longest length.

The connector brackets 78 carried by a spreader 85 are then connected to the lower hooks 79 as best seen in FIGURES 3 and 4. Since the tail end of auxiliary conveyor 11 has advanced past the most recently installed pair of suspending members 12, the spreader 85 is preferably, though not always, connected to hooks 79 by a pair of men, one working on each side of the entry.

The split roller assembly 53 is then connected to the brackets 78 by slipping the milled ends of the shaft 58 into the keyhole slots 83 of the connectors.

Thereafter the turnbuckles 77 are adjusted until the inner ends of roller end portions 53a and 53b are snugged up into load bearing engagement with the lower surfaces of the bottom flanges of channels 37a and 37b. The return reach 32 of the auxiliary conveyor belt will also contact central roller portion 54 at the same time.

The split rollers 53 are used over and over in much the same fashion as pipes which are used to move a heavy block across a floor are employed. That is, as soon as the discharge end of the auxiliary conveyor clears the split roller located furthest downstream, that split roller is immediately removed and carried to the advancing rear end of the auxiliary conveyor to be reinstalled. Only one or two split rollers in addition to those in engagement with the lightweight frame are therefor required. Removing the split rollers after they no longer support the auxiliary conveyor is an easy task since they merely sit loosely in the keyhole slots 83.

After the auxiliary conveyor has advanced past the fixed end of the main conveyor a desired distance, the length of the fixed conveyor is extended to a point close behind the tail pulley 34 of the auxiliary conveyor in one pull out. The housing 27 is advanced since the auxiliary conveyor drive pulley will have "migrated" from its FIGURE 1A position close to the tail end of the auxiliary conveyor to a position close to the head end of the auxiliary conveyor. Actually of course the drive pulley 40 remains stationary between the main conveyor extensions and the auxiliary conveyor advances with respect to it.

As soon as the extension of each side frame is added to the main conveyor, the side frames are clamped to the connector brackets 78 by clamps 82. The suspender members and connector brackets which temporarily support the auxiliary conveyor are thereby used to permanently support the main conveyor. No additional apparatus changes are needed to accomplish this, which is one of the most advantageous features of the invention. Once the suspending members are installed, and the split rollers are placed and replaced, that is the end of operations.

Although several embodiments of the invention have been illustrated and described, it will at once be apparent to those skilled in the art that various modifications may be made without any departure from the spirit and scope of the invention. Accordingly, it is the intention that the scope of the invention should be measured, not by the scope of the exemplary description, but solely by the scope of the appended claims when interpreted in the light of the pertinent prior art.

I claim:

1. An extensible conveyor system, said system including, in combination, a stationary conveyor, an auxiliary rigid frame conveyor vertically aligned above the stationary conveyor, an orbitally movable, endless conveyor belt on each of the stationary and auxiliary conveyors, a stationary drive pulley associated with the stationary conveyor, said drive pulley driving the auxiliary conveyor belt, the auxiliary conveyor belt discharging material at one end of the auxiliary conveyor onto the stationary conveyor, the stationary and auxiliary conveyors being suspended at different points from common elevated support locations by removable support means anchored to the elevated locations so that said support means may be forwardly repositioned to support the advancing auxiliary conveyor, and means for advancing the auxiliary conveyor while maintaining it in discharging relation to the stationary conveyor.

2. An extensible conveyor system as in claim 1 further characterized by and including an auxiliary conveyor belt drive pulley which is driven by the stationary drive pulley associated with the stationary conveyor.

3. An extensible conveyor system, said system including, in combination, a stationary conveyor having a troughing idler assembly suspended between wire rope side frames, an auxiliary rigid frame conveyor vertically aligned above the stationary conveyor, an orbitally movable, endless conveyor belt on each of the stationary and auxiliary conveyors, the auxiliary belt discharging material at one end onto the stationary conveyor, spaced support means anchored at different points to elevated locations, said spaced support means being connected to the wire ropes of the stationary conveyor, roller means transversely positioned relative to the conveyors, said roller means being removably joined to the support means, and said roller means allowing the auxiliary conveyor to advance thereover, and means for advancing the auxiliary conveyor while maintaining it in discharging relationship to the stationary conveyor, whereby said roller means may be dismounted and forwardly repositioned to support the advancing auxiliary conveyor.

4. The extensible conveyor system of claim 3 further characterized in that the support means include downwardly extending suspending assemblies which support both the auxiliary conveyor and the stationary conveyor when both conveyors are disposed beneath a common support location.

5. The extensible conveyor system of claim 4 further characterized in that the suspending assemblies include downwardly extending elongated hangers, means carried at the lower end portions of the hangers for connecting the hangers to the side frames of the stationary conveyor, a pair of oppositely located suspending assemblies carrying said removable roller means, and adjustment means for moving the roller means into supporting engagement with the auxiliary conveyor.

6. A method of continuously extending a conveyor behind an advancing mining operation which conveys mined material on an upper conveyor and transfers said mined material onto a lower conveyor, said method including the steps of vertically aligning an upper auxiliary, endless conveyor with a lower stationary endless conveyor, installing roof supports to roof anchors, connecting the stationary conveyor to the roof supports, removably connecting an auxiliary conveyor supporting structure to the roof supports transversely of the stationary conveyor, advancing the auxiliary conveyor over the support structure, longitudinally of the stationary conveyor, installing the roof supports before the advancing auxiliary conveyor at a rate sufficient to continuously provide adequate support for an advancing end of the auxiliary conveyor, loading mined material onto the auxiliary conveyor, vertically discharging said mined material onto the stationary conveyor, and extending the stationary conveyor by supporting a section thereof of substantial length from previously installed roof supports after the auxiliary conveyor has advanced a distance from the tail end of the stationary conveyor approximately equal to the length of the section to be added.

7. The method of claim 6 further characterized in that the auxiliary conveyor support structure is disassembled from the roof supports at the discharge end of the auxiliary conveyor, said support structure being disassembled prior to the time the advancing end of the auxiliary conveyor clears the auxiliary conveyor supporting structure, and reassembled to the last installed roof supports ahead of the advancing tail end of the auxiliary conveyor.

8. The method of claim 6 further characterized in that the roof supports, immediately after installation, are of a length longer than that needed to suspend the auxiliary and stationary conveyors at a selected elevation, and further including the step of shortening the length of the roof supports after installation to a length adequate to suspend the conveyors at a selected elevation.

References Cited by the Examiner

UNITED STATES PATENTS

| 1,659,316 | 2/28 | Enney | 198—139 |
| 1,748,301 | 2/30 | McKinlay | 198—192 X |
| 2,842,257 | 7/58 | Craggs et al. | |
| 2,851,151 | 9/58 | McCallum | 198—192 |
| 3,062,360 | 11/62 | Arndt et al. | 198—192 |
| 3,127,978 | 4/64 | Zuercher | 198—139 |

FOREIGN PATENTS 530,817  8/54  Belgium.

SAMUEL F. COLEMAN, *Primary Examiner.*

WILLIAM B. LA BORDE, *Examiner.*